United States Patent
Boxall et al.

(10) Patent No.: US 6,530,056 B1
(45) Date of Patent: Mar. 4, 2003

(54) METHOD FOR SETTING A TIMER BASED ON PREVIOUS CHANNEL REQUEST STATISTICS

(75) Inventors: Robert F. Boxall, Morton Grove, IL (US); Robert C. Scheibel, Jr., Elmhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 419 days.

(21) Appl. No.: 09/645,831

(22) Filed: Aug. 25, 2000

(51) Int. Cl.[7] ............................. H04L 1/18; H04L 1/08; H04J 15/00
(52) U.S. Cl. ..................... 714/749; 714/748; 370/468
(58) Field of Search ................. 370/229, 253, 370/329, 468; 714/748–749, 780, 751

(56) References Cited

U.S. PATENT DOCUMENTS

| | | | | |
|---|---|---|---|---|
| 5,528,605 A | * | 6/1996 | Ywoskus et al. | 714/749 |
| 5,793,768 A | * | 8/1998 | Keshav | 370/400 |
| 5,931,916 A | * | 8/1999 | Barker et al. | 709/239 |
| 6,289,224 B1 | * | 9/2001 | Boxall et al. | 455/517 |
| 2002/0122434 A1 | * | 9/2002 | Ido et al. | 370/501 |
| 2002/0124096 A1 | * | 9/2002 | Loguinov et al. | 709/230 |

* cited by examiner

*Primary Examiner*—Albert Decady
*Assistant Examiner*—R. Stephen Dildine

(57) ABSTRACT

In a network utilizing a transmitting peer channel and a receiving peer channel, each channel having a channel gatekeeper, to transport a plurality of types of data packets each having a different priority and requesting an acknowledgment following the transmission of the data packets, a method for dynamically setting the retransmission timer value is disclosed. The method comprises the steps of waiting for the end of a channel burst for a user on the second channel, determining whether the user is requesting an acknowledgment, and determining the retransmission timer value using previous channel request statistics combined with current known gatekeeper information.

8 Claims, 2 Drawing Sheets

METHOD FOR SETTING A TIMER BASED ON PREVIOUS CHANNEL REQUEST STATISTICS

FIELD OF THE INVENTION

The present invention relates generally to error correction in data communications, and more particularly to a method of dynamically setting a retransmission timer in an automatic repeat request mechanism to prevent unnecessary data transmission and delay during the error correction process.

BACKGROUND OF THE INVENTION

In most digital communication systems, whenever error events occur in the transmitted messages, some action must be taken to correct these events. This action may take the form of an error correction procedure that attempts to correct these errors. In some applications where a two-way communication link exists between the sender and the receiver, the receiver may inform the sender that a message has been received in error, and, hence request a repeat of that message. In principle, the procedure may be repeated as many times as necessary until that message is received error free. An error control system in which the erroneously received messages are simply retransmitted is called an automatic repeat request (ARQ) system. One example of an automatic repeat request system is called Selective ARQ. The Selective ARQ system, or S-ARQ, functions in much the same manner as the more "traditional" ARQ systems except for the S-ARQ system only retransmits the parts of messages that are in error rather than retransmit the entire message.

In ARQ systems, the receiver must perform only an error detection procedure on the received messages without attempting to correct the errors. Hence, an error detecting code, in the form of specific redundant or parity-check symbols must be added to the information-bearing sequence. In general, as the error detecting capability of the code increases, the number of added redundant symbols must also be increased. Clearly, with such a system, an erroneously received message is delivered to the user only if the receiver fails to detect the presence of errors. Since error detection coding is simple, powerful, and quite robust, ARQ systems constitute a simple and efficient method for providing highly reliable transfer of messages from the source to the user over a variety of transmission channels. ARQ systems are therefore widely used in data communications that are highly sensitive to errors, such as in computer-to-computer communications.

Despite the wide use of ARQ systems, they are not without limitations. As previously mentioned, many data communications protocols use an Automatic Repeat Request (ARQ) mechanism for error correction. In most cases, the acknowledgment itself is also subject to error, thus requiring its own error correction mechanism. This is generally achieved via the use of a retransmission timer in the transmitter. If, after requesting an acknowledgment, it is not received within a set amount of time (the retransmission timer setting), either a new acknowledgment is requested (polling) or the data is retransmitted. The problem with many peer-to-peer communication links is the large amount of variance that the link bandwidth can experience. This variance leads to a problem in finding a suitable value for the retransmission timer. If the timer is too small then unnecessary data may be retransmitted when the acknowledgment is delayed. If it is too large then there is an increase in delay when the acknowledgment is lost. The problem of varied bandwidth is found in many schemes that retransmit data. For example, the TCP scheme commonly used today also has problem with large variances in channel bandwidth and uses a fixed exponential backoff algorithm to deal with the problem. Another common method for solving this problem involves the use of a fixed length timer. However, in many cases there is too much variability for a fixed timer scheme to work efficiently. Thus, a more effective method for improving the selection of an appropriate retransmission timer value and improving data transmission once an error occurs is needed.

DETAILED DESCRIPTION OF THE PREFERRED EMBODIMENTS

Figure 1:
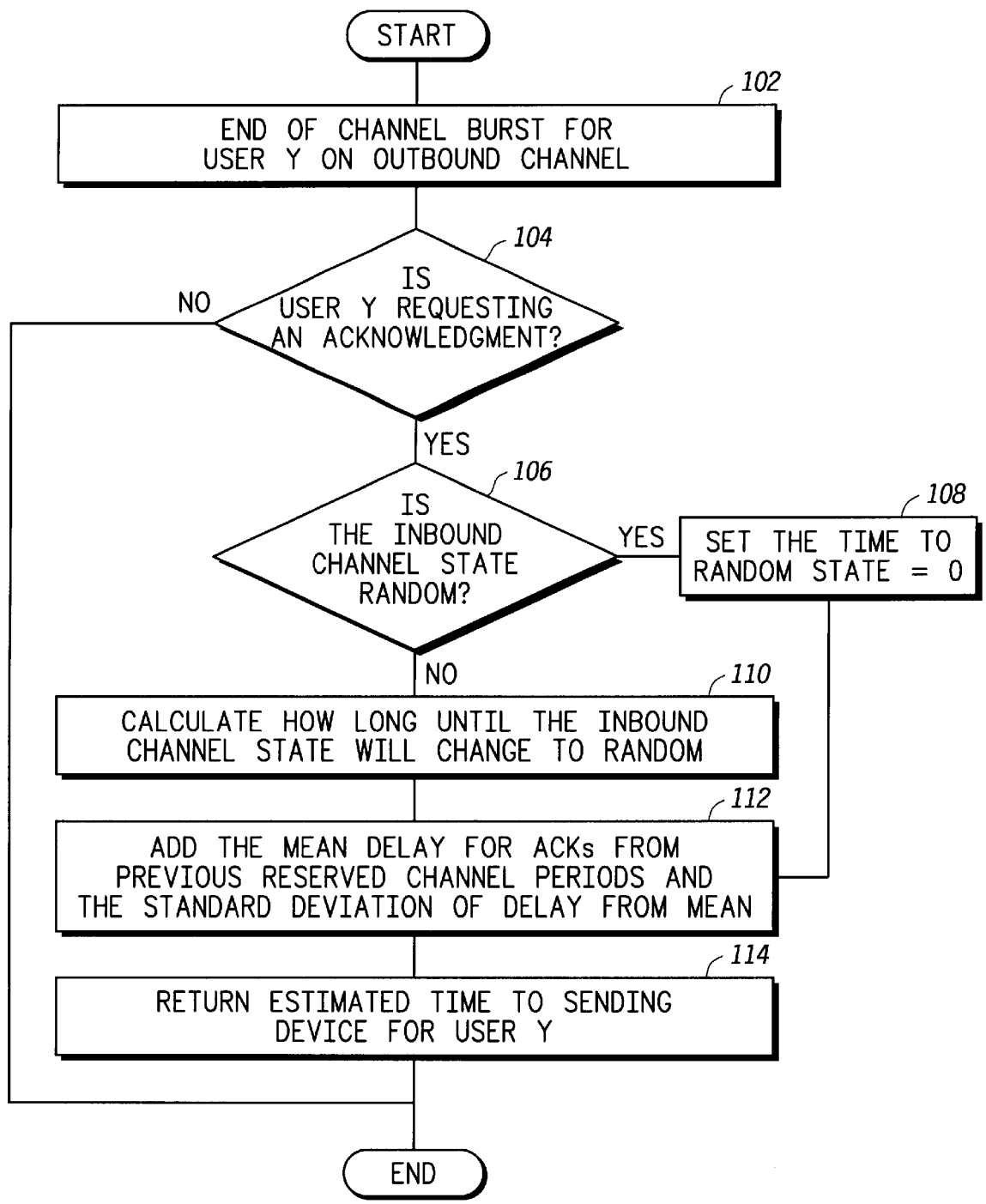
FIG. 1 is a flow chart diagram illustrating one embodiment of a dynamic timer setting algorithm in accordance with the present invention.

The present invention is a method of improving the selection of the retransmission timer value. More particularly, the present invention enables the timer to be dynamically set, on a case by case basis, by combining statistics gathered from watching the delays for the inbound reservation channel with known information from a gatekeeper. A gatekeeper is a device that controls channel access. The gatekeeper allocates bandwidth to users on its channel. Typically, users send request messages to a particular channel's gatekeeper during a random or request period. Each user request typically contains information such as the user id, the priority level of the request and the length of the request. Additionally, the gatekeeper grants users access to the channel based on rules that are defined by a controlling protocol. The protocols vary depending on the information contained in the user requests. The known information is generally in the form of user requests that the gatekeeper received while the inbound bound channel was in a random state.

The packet data channel on the iDEN system is normally allocated a minimum number of slots. In addition to this allocation, the packet data channel is allocated spare slots that are not currently being used for voice. This means that the channel bandwidth is always dynamically changing (from 1 to 12 slots per 12). This dynamic feature of the packet data channel means that a simple fixed constant value for the acknowledgment timer will not work unless it is made very large. This is done to account for the worse case when only 1 out of 12 slots are available for data transmission. If the timer is made large then this will often degrade performance since this value is much larger than is often necessary thus unnecessarily delaying data retransmission. Another feature of the packet data channel is that it will support multiple users at any instant in time. This means that many users are sharing the channel and, depending on their traffic profiles, can cause even more variance in delays.

The dynamic timer setting algorithm enables multiple mobile subscribers (cellular phones) to share a radio channel for data. In the iDEN case, the packet data channel system enables multiple users to share access to the Internet. This differs from a circuit data system in that a circuit data system is typically not shared. A circuit data system uses dedicated bandwidth for a user and during periods that the user is not doing anything, such as reading an email, the channel is wasted. With the packet data channel system, while one user is reading an email, another user can be using the unused channel space. Because the channel is shared, a way of sharing it between users who need it is needed. This is performed by the use of slotted aloha. In the case of slotted aloha, the gatekeeper collects all requests during its random period and grants users channel access based on the request information during its reserved period. During the period of the gatekeeper granting users, the channel is placed in a reserved state. Once the gatekeeper has granted access to all users, the channel is returned to a random state to enable users to make new requests. At any point during the reserved period, the gatekeeper knows exactly the amount of time remaining for the next random period to occur.

The uplink (inbound) channel (the radio channel shared by the users to send data into the infrastructure) can be in one of two states, random and reserved. During the random state users can send in channel reservation requests (stating how much bandwidth they would like and their priority status). These requests are processed by the gatekeeper that changes the channel state to reserved. During the reserved state, the gatekeeper informs users when they may transmit their data. While in the reserved state, only the user that has been granted access to the channel may transmit information, thereby forcing all other users to wait before transmitting their information.

Figure 2:
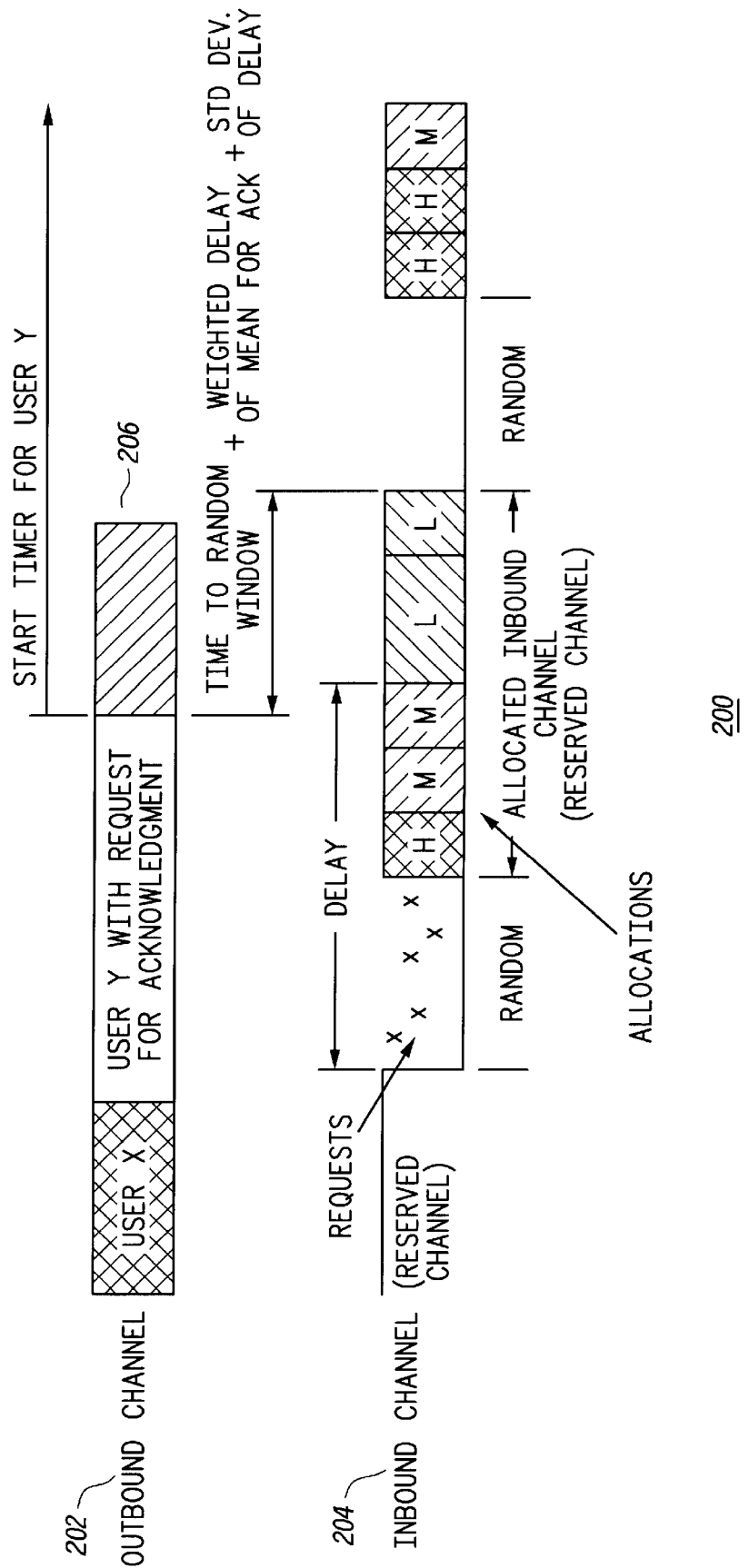
FIG. 2 is a packet transition diagram illustrating a dynamic timer setting algorithm in accordance with the present invention.

In accordance with preferred embodiments of the present invention, and with reference to FIG. 1 and FIG. 2, a dynamic timer setting algorithm is disclosed. As described above, FIG. 1 is a flow chart diagram illustrating a dynamic timer setting system 100. Additionally, FIG. 1 provides further detail on how the dynamic timer setting algorithm solves the problem of delays in receiving acknowledgments. The process begins with step 102 where the end of a channel burst for User Y (an arbitrary user) is received on the outbound channel (shown in FIG. 2). At step 104, the dynamic timer setting algorithm asks if the user is requesting an acknowledgment. If the answer to this question is no then the algorithm ends. If the answer to this question is yes, then the algorithm moves to step 106. At step 106, the algorithm then asks whether the state of the inbound channel is random. If the inbound channel state is random, then the algorithm is programmed to set the time necessary for the inbound channel to become random equal to zero (step 108). If the inbound channel state is not random, then the algorithm is programmed to calculate how much time will pass until the inbound channel state will change to random (step 110). At step 112, the algorithm is programmed to add the mean delay for acknowledgments from previous reserved channel periods and the standard deviation of delay from mean. Finally, at step 114, the estimated time from step 112 is returned to the sending device of user Y.

FIG. 2 is a diagram illustrating one embodiment of a transmission algorithm in accordance with the present invention. FIG. 2 displays the method in which the dynamic timer setting algorithm operates to improve the outbound retransmission timer value. Additionally, FIG. 2 shows an outbound channel 202 and inbound channel 204. The "time to random" window 206 shows how much time is left before the inbound channel state becomes random. This time period changes greatly. The gatekeeper for the inbound channel 204 constantly counts down the amount of time left until the time to next random window 206 appears. Currently timers are set to a fixed value after the outbound channel 202 transmits a request for an acknowledgment. This can be improved by the use of information from the gatekeeper, which is derived from the current and pass channel reservation periods. Each time the inbound channel shifts from random to reserved, the gatekeeper calculates how much time is left for the last medium priority to be granted. The high and medium priorities indicate that the request contains an acknowledgment (which is used to switch off the timer). This information is then used to inform the timer procedure the expected delay for the last requested acknowledgment following the time the inbound channel reverts to random. The calculation would be in the form of the known time to the next random window plus a weighted mean of a sample of previous reserved periods and a constant value or deviation calculation to cover from the inevitable variation from the mean.

The inbound channel 204 is reserved via a request mechanism (Packet Reservation Allocation Procedure, PRAP). All mobile subscribers who want to make a channel allocation request are given a random window of 12 locations where they can make a request. A request has 1 of 3 priorities: high (acknowledgment), medium (acknowledgment and data), and low just data). Once the 12 locations are over the fixed network grants the allocations based on the priority of the requests. These requests can be from 1 to 81 slots each. If there are multiple requests which are large and the packet channel bandwidth is small then the delay could be significant, ranging from 7 to 891 slots (105 to 13365 ms), depending on the number of requests and the current allocation of bandwidth for the packet channel.

Although the present invention has been described with reference to preferred embodiments, workers skilled in the art will recognize that changes may be in form and detail without departing from the spirit and scope of the invention.

What is claimed is:

1. In a peer to peer communication link utilizing a transmitting peer channel and a receiving peer channel, each channel having a channel gatekeeper, to transport a plurality of types of data packets each having a different priority and requesting an acknowledgment following the transmission of the data packets, a method for dynamically setting the retransmission timer value, the method comprising:

waiting for the end of a channel burst for a user on the transmitting peer channel;

determining whether the user is requesting an acknowledgment; and determining the retransmission timer value using known gatekeeper information.

2. The method of claim 1, wherein the step of determining the retransmission timer value further comprises the step of determining the state of the receiving peer channel.

3. The method of claim 2, wherein the step of determining the state of the receiving peer channel further comprises the step of calculating the amount of time needed before the receiving peer channel will change to a random state.

4. The method of claim 1, wherein the step of determining the retransmission timer value further comprises the step of gathering previous channel request statistics.

5. The method of claim 1, wherein the step of determining the retransmission timer value further comprises the step of performing a first calculation based on the number of acknowledgments from the previous channel request statistics.

6. The method of claim 1, wherein the step of determining the retransmission timer value further comprises the step of performing a second calculation based on the results from the first calculation.

7. The method of claim 1, wherein the step of determining the retransmission timer value further comprises the step of combining the results of the first and second calculations with the results of the calculation performed to determine the amount of time needed before the receiving peer channel will change to a random state.

8. The method of claim 1, wherein the step of determining the retransmission timer value further comprises the step of sending the value determined by combining the results of the first and second calculations with the results of the calculation performed to determine the amount of time needed before the receiving peer channel will change to a random state to a sending device of a user as the retransmission timer value.

* * * * *